(12) United States Patent
Hermann

(10) Patent No.: US 12,368,350 B2
(45) Date of Patent: Jul. 22, 2025

(54) ELECTRIC-MOTOR DRIVE FOR A MOTOR VEHICLE AND RADIATOR FAN WITH AN ELECTRICALLY CONDUCTIVE COVER FOR SHIELDING ELECTROMAGNETIC INTERFERENCE

(71) Applicant: Brose Fahrzeugteile SE & Co. Kommanditgesellschaft, Würzburg, Würzburg (DE)

(72) Inventor: Eugen Hermann, Grossheirath (DE)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 162 days.

(21) Appl. No.: 17/953,537

(22) Filed: Sep. 27, 2022

(65) Prior Publication Data

US 2023/0019265 A1   Jan. 19, 2023

Related U.S. Application Data

(63) Continuation of application No. PCT/EP2021/057756, filed on Mar. 25, 2021.

(30) Foreign Application Priority Data

Mar. 27, 2020   (DE) .................... 10 2020 204 030.3

(51) Int. Cl.
*H02K 11/02*   (2016.01)
*F01P 5/04*   (2006.01)
*H02K 5/20*   (2006.01)

(52) U.S. Cl.
CPC ............... *H02K 11/02* (2013.01); *F01P 5/04* (2013.01); *H02K 5/207* (2021.01); *F01P 2005/046* (2013.01); *H02K 2205/09* (2013.01)

(58) Field of Classification Search
CPC ............ H02K 5/207; H02K 9/14; H02K 9/16; H02K 11/0141; H02K 11/02; F01P 5/04
See application file for complete search history.

(56) References Cited

U.S. PATENT DOCUMENTS 9,954,410 B2   4/2018   Furutachi
9,991,769 B2   6/2018   Furutachi
(Continued)

FOREIGN PATENT DOCUMENTS

CN   103812275 A   5/2014
DE   102015217702 A1   3/2016
(Continued)

*Primary Examiner* — Tulsidas C Patel
*Assistant Examiner* — Robert E Mates
(74) *Attorney, Agent, or Firm* — Laurence A. Greenberg; Werner H. Stemer; Ralph E. Locher

(57) ABSTRACT

An electric-motor drive, more particularly a fan drive, is provided for a motor vehicle. The drive contains an electric motor which has a rotatably mounted rotor and a stator having a laminated core. The laminated core forms a stator yoke and stator teeth of the stator, the stator teeth are directed radially from the stator yoke, and a stator winding is supported on the stator teeth. An electrically conductive covering part is provided for influencing and/or screening electromagnetic interference fields produced during the electric-motor operation. The covering part has a sleeve-type lateral wall and a circular-ring-shaped cover surface, which protrudes radially inward from an end of the lateral wall. The lateral wall is placed onto an outer periphery of the stator yoke. The cover surface axially covers the stator winding at least partly, and the lateral wall has a number of venting openings.

11 Claims, 3 Drawing Sheets

(56) References Cited

U.S. PATENT DOCUMENTS

| | | |
|---|---|---|
| 10,069,372 B2 | 9/2018 | Furutachi |
| 10,186,936 B2 | 1/2019 | Froehlich et al. |
| 10,348,151 B2 | 7/2019 | Furutachi |
| 11,133,723 B2 | 9/2021 | Hirsch et al. |
| 2002/0109425 A1 | 8/2002 | Modi et al. |
| 2009/0108714 A1 | 4/2009 | Fakes |
| 2017/0033646 A1 | 2/2017 | Capoulun et al. |
| 2018/0298908 A1 | 10/2018 | Capoulun et al. |
| 2019/0036426 A1 | 1/2019 | Umeda et al. |
| 2019/0356201 A1 | 11/2019 | Li et al. |
| 2020/0119616 A1 | 4/2020 | Ludwig et al. |

FOREIGN PATENT DOCUMENTS

| | | | |
|---|---|---|---|
| DE | 102015204026 B3 | 6/2016 | |
| DE | 102017210734 A1 * | 12/2018 | ................ F01P 5/04 |
| DE | 112017001793 T5 | 12/2018 | |
| DE | 102019113118 A1 | 11/2019 | |
| EP | 3512077 A1 | 7/2019 | |

\* cited by examiner

ELECTRIC-MOTOR DRIVE FOR A MOTOR VEHICLE AND RADIATOR FAN WITH AN ELECTRICALLY CONDUCTIVE COVER FOR SHIELDING ELECTROMAGNETIC INTERFERENCE

CROSS-REFERENCE TO RELATED APPLICATION

This application is a continuation, under 35 U.S.C. § 120, of copending International Patent Application PCT/EP2021/057756, filed Mar. 25, 2021, which designated the United States; this application also claims the priority, under 35 U.S.C. § 119, of German Patent Application DE 10 2020 204 030.3, filed Mar. 27, 2020; the prior applications are herewith incorporated by reference in their entirety.

FIELD AND BACKGROUND OF THE INVENTION

The invention relates to an electric-motor drive for a motor vehicle, in particular a fan drive, containing an electric motor, which has a rotor rotatable about a rotation axis relative to a fixed stator. The invention further relates to an electric motor for such a drive, and to a radiator fan for a motor vehicle, the fan having such a drive.

Motor vehicles with an internal combustion engine generate a considerable amount of heat during operation. To maintain the operating temperature or within an air conditioning system, a coolant is typically used, which in turn must be cooled. This is usually achieved by cooling air, which passes over cooling fins that are in thermal equilibrium with the coolant. Since the headwind is usually insufficient for cooling, particularly at low driving speeds, it is possible, for example, to attach a fan shroud having an electric (electric-motor) drive to the radiator containing the cooling fins, the drive generating an additional airflow that is guided by the fan shroud. For this purpose, the (fan) drive has an electric motor, which is coupled in terms of drive to a drive part, in particular to a fan wheel generating the airflow.

Conventionally, the fan shroud has a substantially round recess, within which the fan drive is arranged. The plane in which the fan wheel is located is substantially parallel to the plane of the cooling fins. The electric motor, which is coupled to the fan wheel in terms of drive, is fixed at the end face to a rigid mounting by means of screws or rivets, for example, wherein the mounting is held in the center of the recess by means of radially extending struts.

For example, brushless electric motors are used for this purpose, in which a rotor mounted rotatably relative to a stator is driven by a rotating magnetic field. During electric-motor operation, alternating currents are generated in the lines of the motor electronics and in the rotating field winding due to switching processes. These alternating currents generate corresponding electromagnetic interference fields, which are considered to be critical in terms of compliance with EMC (electromagnetic compatibility) guidelines.

Published, non-prosecuted German patent application DE 10 2017 210 734 A1, corresponding to U.S. patent publication No. 2020/0119616, discloses an electromotive drive with a covering part for influencing and/or shielding electromagnetic interference fields generated during electric-motor operation. The covering part is embodied, for example, as a sleeve-shaped casing, which is placed on an outer circumference of the stator. Here, the casing has a number of radially inwardly bent tabs which at least partially cover coils of a stator winding.

German patent DE 11 2017 001 793 T5, corresponding to U.S. patent publication No. 2019/0036426, describes an electric-motor drive with a circular-ring-shaped covering part which is mounted axially on the stator at an end face. Here, the covering part has a number of circumferentially distributed openings to improve the cooling performance. The covering part is thus open here at the end face for cooling the engine compartment or for ventilation of the engine compartment.

Published, non-prosecuted German patent application DE 10 2015 217 702 A1, corresponding to U.S. Pat. Nos. 10,348,151, 10,069,372, 9,991,769 and 9,954,410, describes an electric-motor drive with a cylindrical covering part which has a number of circumferentially distributed openings on the end face, each of which is arranged between two adjacent stator teeth. The openings on the end face are also used solely for cooling the engine compartment or for ventilation of the engine compartment.

SUMMARY OF THE INVENTION

The object of the invention is to describe a particularly suitable electric-motor drive for a motor vehicle. In particular, the drive is to be improved with respect to the radiation of electromagnetic interference fields during electric-motor operation. A further object of the invention is to describe an electric motor suitable for such a drive and also a radiator fan for a motor vehicle, said fan being provided with such a drive.

With the foregoing and other objects in view there is provided, in accordance with the invention, an electric-motor drive for a motor vehicle. The electric motor drive contains an electric motor having a rotatably mounted rotor and a stator with a laminated core forming a stator yoke and stator teeth. The stator teeth of the stator are directed radially from the stator yoke. The stator further has a stator winding supported on the stator teeth. An electrically conductive covering part is provided for influencing and/or shielding electromagnetic interference fields produced during an operation of the electric motor. The electrically conductive covering part has a sleeve-shaped casing and a circular-ring-shaped cover surface, which protrudes radially inward at an end face of the sleeve-shaped casing. The sleeve-shaped casing is placed onto an outer circumference of the stator yoke. The circular-ring-shaped cover surface axially covers the stator winding at least partly, and wherein the sleeve-shaped casing has a number of ventilation openings formed therein.

With regard to the drive, the object is achieved in accordance with the invention with the features of the independent drive claim and, with regard to the electric motor, with the features of the independent electric motor claim and, with regard to the radiator fan, with the features of the independent radiator fan claim. Advantageous embodiments and developments are the subject of the dependent claims.

The electric-motor drive according to the invention is intended for a motor vehicle and is suitable and configured for this purpose. The drive is formed here in particular as a fan drive. The drive has an electric motor with a rotatably mounted rotor and with a fixed or stationary stator.

The stator has a laminated core (stator laminated core) which forms a stator yoke and stator teeth directed radially therefrom, wherein a stator winding is supported on the stator teeth. The stator winding is formed, for example, from a number of interconnected stator coils, which are applied to the stator teeth.

The drive also has an electrically conductive covering part for influencing and/or shielding electromagnetic interference fields produced during electric-motor operation. Suitably, the covering part is electrically conductively coupled to an electrical ground, for example a motor support carrying the electric motor. The covering part according to the invention intercepts and/or damps and/or diverts and/or weakens electromagnetic interference fields generated during operation, so that the electromagnetic compatibility (EMC) of the drive is improved. The conjunction "and/or" is to be understood here and in the following in such a way that the features linked by means of this conjunction can be formed both together and as alternatives to one another.

The covering part has a sleeve-like casing and a circular-ring-shaped cover surface, wherein the cover surface is arranged protruding radially inward at one end face of the casing. In the assembled state, the casing is placed onto an outer circumference of the stator yoke, wherein the cover surface axially covers the stator winding at least partly. In accordance with the invention, the casing is provided here with a number of ventilation openings distributed along a circumferential direction. Thus, on the one hand, the cover surface provides a reliable, end-face shielding and/or weakening of the electromagnetic interference fields in the axial direction. On the other hand, reliable air circulation and thus (air) cooling of the stator winding is made possible by the circumferential ventilation openings of the cover, so that the covering part has minimal or substantially no influence on the motor cooling or stator cooling. This makes for a particularly suitable electric-motor drive.

The covering part preferably has a high shielding potential, so that EMC specifications are met. Furthermore, the covering part provides a cost-effective and robust mechanical reduction of electromagnetic interference fields. The covering part is easy to install and has a simple component geometry. In particular, the covering part is embodied here separately from the stator, so that it can be used optionally.

In the assembled state, the covering part is held statically on the stator, so that the covering part has substantially no influence on the balance quality of the electric motor. Preferably, the covering part is fastened or held here on the stator yoke by means of the casing, so that advantageous use is made of existing fastening options in the drive or in the electric motor. This means that there is substantially no influence of the covering part on the available installation space.

The term "axial" or an "axial direction" is understood here and in the following in particular to mean a direction parallel (coaxial) to the rotation axis of the electric motor, i.e. perpendicular to the end faces of the stator. Correspondingly, "radial" or a "radial direction" is understood here and in the following to mean in particular a direction perpendicular (transverse) to the rotation axis of the electric motor along a radius of the stator or the electric motor. A "circumferential direction" is understood here and in the following in particular to mean a direction along the circumference of the stator or the electric motor (tangential direction, azimuthal direction), i.e. a direction perpendicular to the axial direction and the radial direction.

In an expedient embodiment, the ventilation openings are provided along the circumferential direction in the region of corresponding stator teeth. In other words, the casing has at least a number of ventilation openings corresponding to the number of stator teeth. The ventilation openings open here in particular into the region of a termination, so that reliable cooling of the stator teeth and thus of the stator winding is ensured. In a preferred embodiment, two ventilation openings are provided for each stator tooth.

Alternatively, it is also conceivable, for example, that the number of ventilation openings is smaller than the number of stator teeth. In such an embodiment, for example, a large ventilation opening extends over two stator teeth in each case.

The cover surface is, for example, a continuous circular ring, so that the stator winding including a termination is substantially completely covered. In an advantageous development, however, the cover surface has a number of openings distributed along a circumferential direction. In other words, the end-face cover surface is partially open along the circumferential direction.

In a suitable set-up, the openings are arranged here in circumferential directions between two adjacent stator teeth. This means that the openings are only provided in the regions in which no coil or stator windings are arranged. This ensures reliable shielding of the electromagnetic interference fields. In particular, ventilation openings of the casing for radial cooling and the end-face or axial openings of the cover surface are provided alternately along the circumferential direction.

In one possible embodiment, the stator has a termination, which is applied to the stator laminated core, as a wire guide. The termination is embodied here as a segmented circular ring-like wall which protrudes axially from the stator laminated core. The segmented wall forms protruding wire retaining lugs for guiding a winding wire of the stator winding. The termination is, for example, part of a plastics over-molding of the stator laminated core or part of a circuit unit (circuit ring, contact device) placed on the stator laminated core. The termination makes it possible to guide the winding wires of the stator winding circumferentially behind the stator teeth from stator tooth to stator tooth during a winding process, so that the winding wires do not collide with the winding tool.

In an advantageous embodiment, the openings of the cover surface are arranged here in the region of the termination or the segmented walls. As a result, the termination is seated in the openings of the cover surface. In other words, the termination passes through the cover surface in the region of the openings. On the one hand, this prevents the covering part from rotating relative to the stator. On the other hand, a positioning aid is formed during assembly of the covering part. Furthermore, the electric motor always has the same overall height, with and without the covering part.

The openings in the cover surface serve here exclusively to meet the axial installation space requirements and have no cooling function, since the engaging elements of the termination or stator over-molding fill them substantially completely. In other words, the openings of the cover surface do not act as cooling openings for temperature control or cooling of the engine compartment. The openings are thus substantially closed by the seated termination or wire guide.

The openings of the cover surface thus differ with respect to DE 10 2015 217 702 A1 and DE 11 2017 001 793 T5 in that they make no or only a negligible contribution to the engine compartment ventilation or to the cooling of the engine compartment. In contrast to the prior art, the openings of the cover surface in accordance with the invention are provided only to reduce the axial installation space requirement of the covering part, and in this respect lie as closely as possible or close to the wire guides of the termination. Although there is a certain gap region between the seated termination and the surrounding opening due to tolerances and play, it is dimensioned to be as small as possible so that no significant contribution is made to the engine compartment ventilation and/or cooling of the engine compartment.

In a structurally particularly stable set-up, the cover surface is molded integrally, i.e. in one piece or monolithically, with the casing. In other words, the cover surface and the casing form a common component. This allows for particularly simple assembly.

An additional or further aspect of the invention provides an electric motor for a drive described above. In this regard, the explanations in conjunction with the drive also apply, mutatis mutandis, to the electric motor, and vice versa.

The electric motor is suitably formed as an internal rotor.

The radiator fan according to the invention is intended for a motor vehicle, and is suitable and configured for that purpose. The radiator fan has an electric-motor drive as described above and a fan wheel driven thereby. The advantages and embodiments mentioned with regard to the drive and/or the electric motor can also be applied analogously to the radiator fan, and vice versa.

Other features which are considered as characteristic for the invention are set forth in the appended claims.

Although the invention is illustrated and described herein as embodied in an electric-motor drive for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Corresponding parts and variables are always provided with the same reference signs in all figures.

Figure 1:
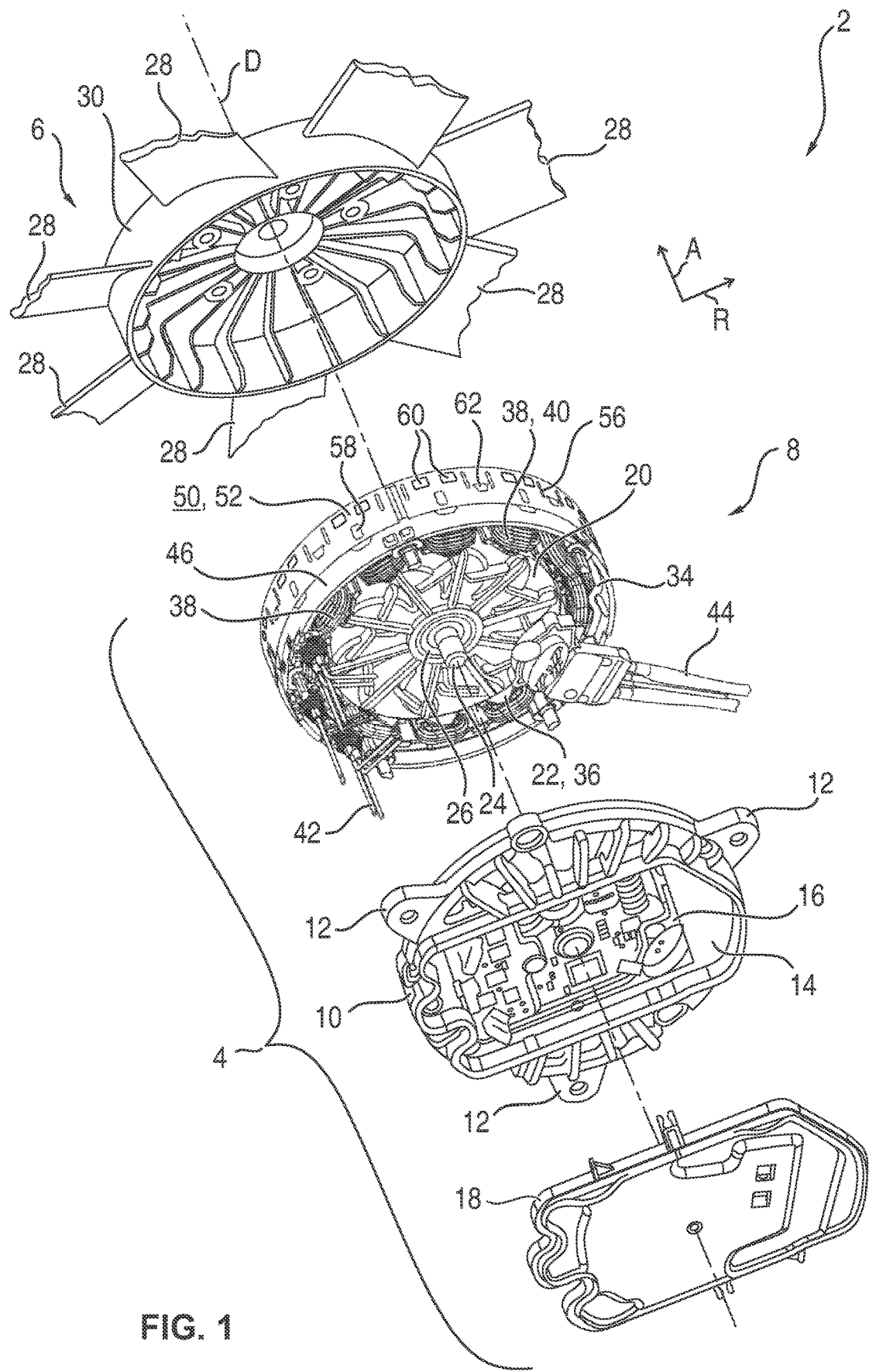
FIG. 1 is a diagrammatic, exploded, perspective view of a radiator fan with an electric motor drive according to the invention.

Referring now to the figures of the drawings in detail and first, particularly to FIG. 1 thereof, there is shown an exploded view of a radiator fan 2, which is intended in particular for use in a motor vehicle, not shown further. The radiator fan 2 has an electric-motor drive 4 and a fan wheel 6 coupled thereto.

The drive 4 has an electric motor 8, which is coupled to the fan wheel 6 at one end face and to a motor support 10 on the end face facing away from the fan wheel 6. The motor support 10 has three flange lugs 12 for securing the radiator fan 2 in position. The motor support 10 also has an electronics compartment 14 for motor electronics 16 on its side facing away from the electric motor 8, the motor electronics 16 being covered by an electronics compartment cover 18 in the assembled state.

The electric motor 8 contains a rotor 20 and a stator 22. The rotor 20 is mounted rotationally or rotatably about an axis of rotation D by means of an axle pin 24, wherein the axis of rotation D is oriented along an axial direction A of the electric motor 8.

The rotor 20 is rotatably mounted on the axle pin 24 by means of bearings 26. In the exemplary embodiment shown, the electric motor 8 is formed as an internal rotor, which means that the stator 22 encloses the rotor 20 coaxially on the outside with respect to a radial direction R running perpendicular to the axial direction A. The rotor 20 is mounted on the axle pin 24 by means of bearings 26. However, in a variant of the drive 4 according to the invention, not shown further, the electric motor 8 is formed as an external rotor. In this case, the explanations given in the following apply analogously.

The rotor 20 is in drive connection to a fan wheel 6. On its outer circumference, the fan wheel has air guide vanes 28, which are only shown in part for the sake of a better overview. The fan wheel 6 has a central cap 30, which is attached to the rotor 20 of the electric motor 8.

Figure 2:
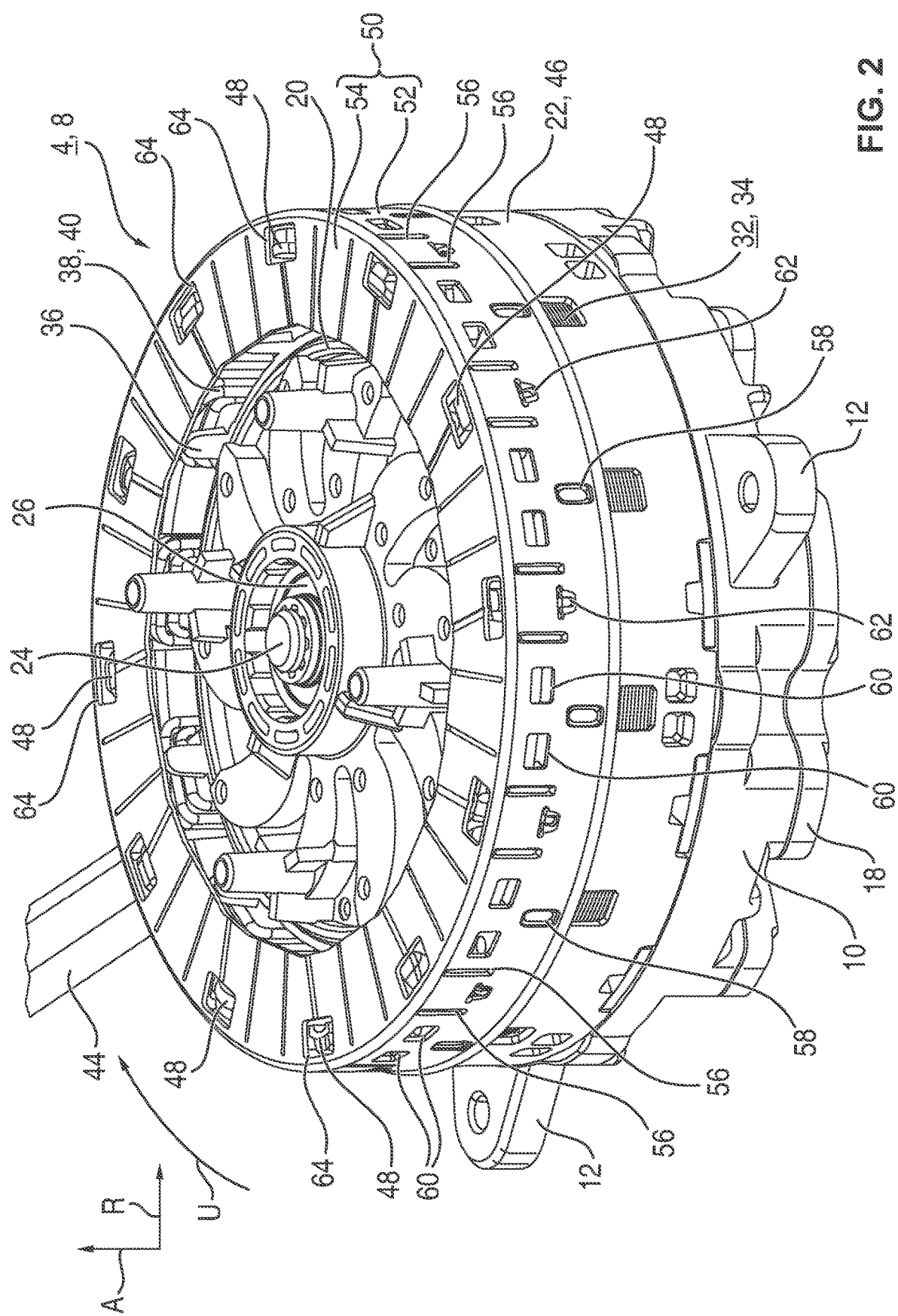
FIG. 2 is a perspective view of the drive with a covering part.

The stator 22 is substantially formed by a circular-ring-like, in particular interlocked, (stator) laminated core 32 (FIG. 2). The laminated core 32 has a substantially hollow-cylindrical stator yoke 34. Extending from this are a number of stator teeth 36, which are arranged in a star shape and are directed radially inwardly towards the rotor 20. In the embodiment shown, for example, twelve stator teeth 36 are provided.

Between adjacent stator teeth 36, an unspecified stator slot is formed in each case, in which a coil 38 of a stator winding 40 is accommodated. In other words, the stator teeth 36 are provided with the multi-phase rotating field winding as stator winding 40, wherein each phase contains at least one coil or coil winding 38, which has a first and a second coil end. The coils 38 are arranged here in particular as single coils, on a stator tooth 36 each. Alternatively, double or multiple coils are also conceivable, the coil winding 40 of which is applied to two or more stator teeth 36.

The stator winding 40 is energized here by the motor electronics 16 by means of phase connections 42 to generate a rotating field. The motor electronics 16 is connected to a power supply, for example to a vehicle electrical system, by means of a connecting cable 44.

A plastics over-molding 46 is provided, for example, for routing, contacting and connecting the coil ends to the rotating field winding 40. Alternatively, the stator 22 has, for example, an annular contact device (wiring unit) in the form of routing or wiring rings placed on an end face of the laminated core 32.

As a result of the plastics over-molding 46, the stator teeth 36 are substantially surrounded by insulating coil or winding bodies. The coil bodies have, for example, groove-like recesses for guiding the winding wires and flange-like side walls for preventing (radial) detachment of the finished coil 38 from the stator tooth 36.

The plastics over-molding 46 has an integrally molded termination 48, which protrudes axially in the form of a segmented circular-ring-like wall from the laminated core 32. The termination 48 allows the winding wires to be guided from stator tooth 36 to stator tooth 36 on the circumferential side behind the stator teeth 36 during a winding process, so that the winding wires do not collide with a winding tool.

FIG. 2 shows the drive 4 with a view of an end face facing the fan wheel 6. A covering part 50 is placed on the end face of the electric motor 8. The covering part 50 is made of an electrically conductive material and, for example, is electrically conductively connected to the motor support 10 as ground potential. The covering part 50 intercepts and/or damps and/or diverts and/or weakens electromagnetic interference fields of the stator winding 40 generated during operation, so that the electromagnetic compatibility (EMC) of the drive 4 is improved.

Figure 3:
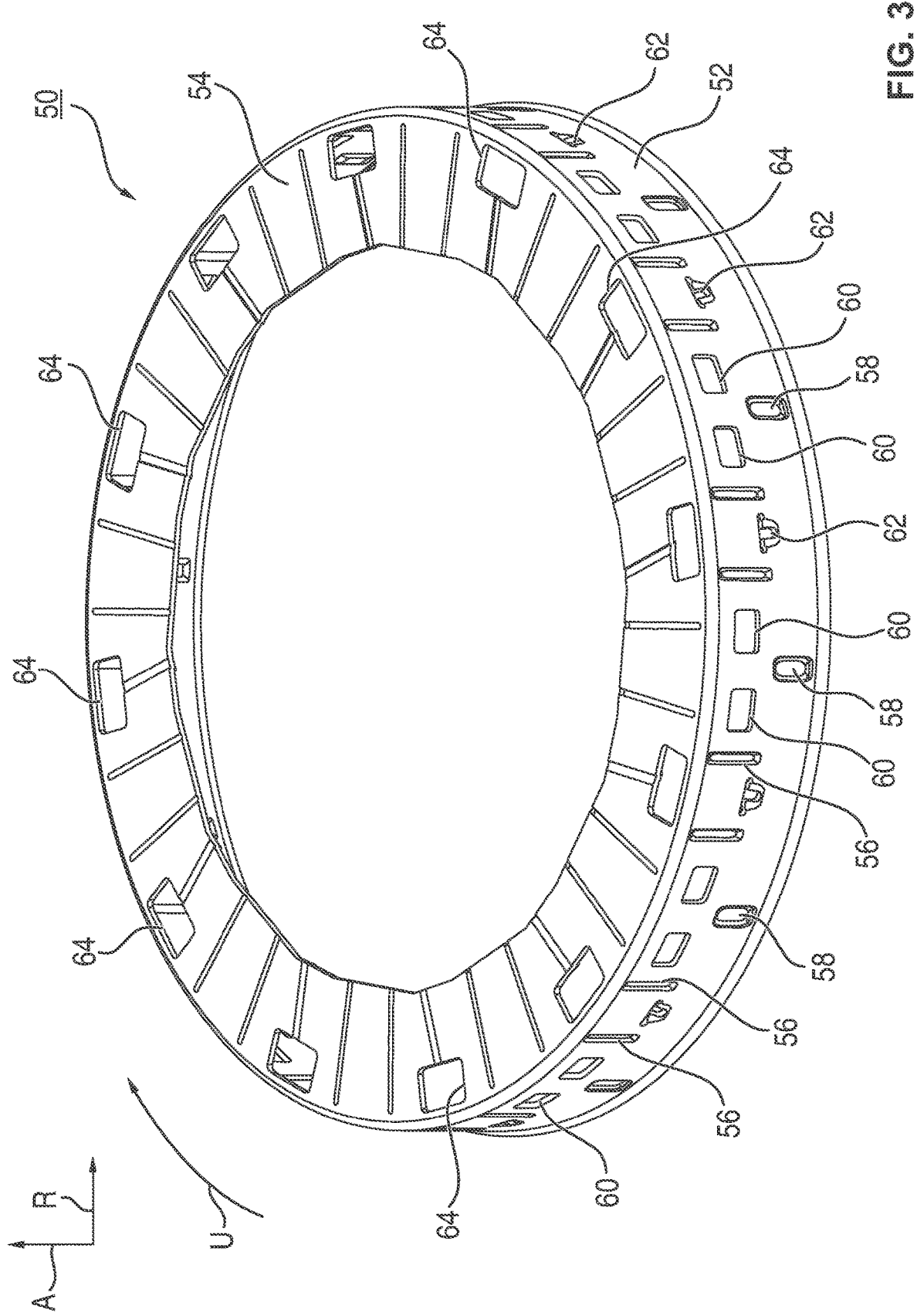
FIG. 3 is a perspective view of the covering part.

The covering part 50 shown individually in FIG. 3 has a (sleeve, stator) casing 52, which, in the assembled state, is placed on the outer circumference of the stator 22 or the stator yoke 34.

The covering part 50 also has a cover surface 54, in particular integrally molded onto the end face of the casing 52. The approximately circular-ring-shaped cover surface 54 is molded onto the end face of the casing 52 facing the fan wheel 6, protruding radially inwards. In other words, the cover surface 54 is bent radially inwardly from the casing 52. As can be seen in particular in FIG. 2, the cover surface 54 overlaps or covers the coils 38 of the stator winding 40. This means that the stator winding 40 is covered axially in the direction of the fan wheel 6 by means of the cover surface 54.

In this exemplary embodiment, twenty-four circumferentially distributed beads 56, two for each stator tooth 36, are formed in the outer surface of the casing 52 facing away from the stator 22 and protrude radially into the opening of the casing 52 on the inner surface of the casing facing the stator 22. The beads 56 serve to compensate for the radial play or for radial tolerance compensation between the covering part 50 and the outer circumference of the stator 22 or the stator yoke 34.

Between the beads 56 of an associated stator tooth 36, a bead-like contact element 58 is integrally molded in the casing 52 in each case. In the assembled state, the contact element 58 is in electrically conductive contact with the laminated core 32.

Between the beads 56, i.e. in the region of each stator tooth 36, two window-like ventilation openings 60 are furthermore introduced in each case. This means that the ventilation openings 60 are arranged distributed along a circumferential direction U on the casing 52. The circumferential ventilation openings 60 of the casing 52 allow reliable air circulation and thus (air) cooling of the stator winding 40, so that the covering part 60 has minimal or substantially no influence on the motor cooling or stator cooling.

In each of the stator slot regions between the stator teeth 36, a locking-tab-like fixing element 62 is introduced into the casing 52. The fixing elements 62 serve to axially fix or fasten the covering part 50 to the stator 22. For this purpose, in the assembled state, the fixing elements 62 engage behind an edge protruding at least partially radially from the laminated core 32 or the plastics over-molding 46. As a result, the covering part 50 is held statically on the stator 22, so that the covering part has substantially no influence on the balance quality of the electric motor 8.

The casing 52 of the covering part 50 is formed, for example, from a rolled or bent strip-shaped sheet metal part, wherein the opposite end faces of the sheet metal part are joined together at a joint to form the circular-ring-shaped casing 52. Alternatively, the covering part 50 or the casing 52 is embodied as a deep-drawn component.

The cover surface has a number of window-like openings 64 distributed along a circumferential direction U. In other words, the cover surface is partially open along the circumferential direction U. The openings 64 are arranged here in circumferential directions U between two adjacent stator teeth 36, that is to say in the region of the stator slots. The openings 64 are thus arranged in the region of the termination 48. As a result, the termination 48 is seated in the openings of the cover surface 64. On the one hand, the termination 48 thus acts as an anti-rotation means for the covering part 50 with respect to the stator 22. On the other hand, a positioning aid is formed during assembly of the covering part 50. Furthermore, the electric motor 8 thus has the same axial overall height with and without the covering part 50. Due to the seated termination 48, the openings 64 do not contribute to internal motor ventilation or cooling of the motor interior.

The invention is not limited to the exemplary embodiments described above. Rather, other variants of the invention can also be derived therefrom by a person skilled in the art, without departing from the subject matter of the invention. In particular, all the individual features described in conjunction with the exemplary embodiments can also be combined with one another in other ways, without departing from the subject matter of the invention.

The following is a summary list of reference numerals and the corresponding structure used in the above description of the invention:

2 radiator fan
4 drive
6 fan wheel
8 electric motor
10 motor support
12 flange tab
14 electronics compartment
16 motor electronics
18 electronics compartment cover
20 rotor
22 stator
24 axle pin
26 bearing
28 air guide vane
30 cap
32 laminated stack
34 stator yoke
36 stator tooth
38 coil
40 stator winding
42 phase connection
44 connection cable
46 plastics overmolding
48 termination
50 covering part
52 casing
54 cover surface
56 bead
58 contact element
60 ventilation opening
62 fixing element
64 opening
A axial direction
R radial direction
U circumferential direction

The invention claimed is:

1. An electric-motor drive for a motor vehicle, comprising:
an electric motor having a rotatably mounted rotor and a stator with a laminated core forming a stator yoke and stator teeth, said stator teeth of said stator being directed radially from said stator yoke, wherein said stator further having a stator winding supported on said stator teeth, wherein said stator additionally has a termination; and an electrically conductive covering part for influencing and/or shielding electromagnetic interference fields produced during an operation of said electric motor, said electrically conductive covering part having a sleeve-shaped casing and a circular-ring-shaped cover surface, which protrudes radially inward at an end face of said sleeve-shaped casing, wherein said circular-ring-shaped cover surface is a continuous circular ring having a plurality of window-shaped openings formed therein and said termination is seated in said openings, wherein said window-shaped openings are enclosed all around by a material of said circular-ring-shaped cover surface, wherein said sleeve-shaped casing is placed onto an outer circumference of said stator yoke, wherein said circular-ring-shaped cover surface axially covers said stator winding at least partly, and wherein said sleeve-shaped casing has a number of ventilation openings formed therein.

2. The electric-motor drive according to claim 1, wherein at least one of said ventilation openings of said sleeve-shaped casing is disposed in a region of a stator tooth of said stator teeth.

3. The electric-motor drive according to claim 1, wherein said openings of said circular-ring-shaped cover surface are distributed along a circumferential direction.

4. The electric-motor drive according to claim 3, wherein said openings are disposed in the circumferential direction between two adjacent said stator teeth.

5. The electric-motor drive according to claim 3, wherein said termination of said stator is applied to said laminated core and protrudes axially from said laminated core as a segmented circular-ring-shaped wall.

6. The electric-motor drive according to claim 5, wherein said openings are disposed in a region of said termination.

7. The electric-motor drive according to claim 1, wherein said circular-ring-shaped cover surface is integrally molded onto said sleeve-shaped casing.

8. The electric-motor drive according to claim 1, wherein the electric-motor drive is a fan drive.

9. A radiator fan for a motor vehicle, comprising:
said electric-motor drive according to claim 1; and
a fan wheel coupled to said electric-motor drive.

10. An electric motor for an electric-motor drive, the electric motor comprising:
a rotatably mounted rotor;
a stator with a laminated core forming a stator yoke and stator teeth, said stator teeth of said stator being directed radially from said stator yoke, wherein said stator has a stator winding supported on said stator teeth and a termination; and
an electrically conductive covering part for influencing and/or shielding electromagnetic interference fields produced during an operation of said electric motor, said electrically conductive covering part having a sleeve-shaped casing and a circular-ring-shaped cover surface, which protrudes radially inward at an end face of said sleeve-shaped casing, wherein said circular-ring-shaped cover surface is a continuous circular ring having a plurality of window-shaped openings formed therein and said termination is seated in said openings, wherein said window-shaped openings are enclosed all around by a material of said circular-ring-shaped cover surface, wherein said sleeve-shaped casing is placed onto an outer circumference of said stator yoke, wherein said circular-ring-shaped cover surface axially covers said stator winding at least partly, and wherein said sleeve-shaped casing has a number of ventilation openings formed therein.

11. The electric motor according to claim 10, wherein the electric motor is embodied as an internal rotor.

* * * * *